(12) United States Patent
Lapalus et al.

(10) Patent No.: US 11,643,221 B2
(45) Date of Patent: May 9, 2023

(54) STARTING/GENERATING SYSTEM AND METHOD FOR AN AIRCRAFT TURBINE ENGINE

(71) Applicant: SAFRAN ELECTRICAL & POWER, Blagnac (FR)

(72) Inventors: Philippe Lapalus, Blagnac (FR); Florent Nierlich, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 132 days.

(21) Appl. No.: 17/044,737

(22) PCT Filed: Apr. 2, 2019

(86) PCT No.: PCT/EP2019/058305
§ 371 (c)(1),
(2) Date: Oct. 1, 2020

(87) PCT Pub. No.: WO2019/197224
PCT Pub. Date: Oct. 17, 2019

(65) Prior Publication Data
US 2021/0101698 A1    Apr. 8, 2021

(30) Foreign Application Priority Data

Apr. 9, 2018 (FR) ........................................ 1853049

(51) Int. Cl.
*B64D 27/10* (2006.01)
*B64F 1/34* (2006.01)

(52) U.S. Cl.
CPC ................ *B64F 1/34* (2013.01); *B64D 27/10* (2013.01); *B64D 2221/00* (2013.01)

(58) Field of Classification Search
CPC .......... B64D 2221/00; B64D 2027/026; B64D 27/10
See application file for complete search history.

(56) References Cited

U.S. PATENT DOCUMENTS

| 6,092,360 A * | 7/2000 | Hoag | ........................ F02C 7/32 60/39.83 |
| 2010/0193630 A1* | 8/2010 | Duces | ........................ H02J 4/00 244/58 |

(Continued)

FOREIGN PATENT DOCUMENTS

EP    2886387 A2    6/2015

OTHER PUBLICATIONS

Search Report from French Intellectual Property Office on corresponding FR application (FR1853049) dated Jan. 22, 2019.

(Continued)

*Primary Examiner* — Timothy D Collins
*Assistant Examiner* — Justin Michael Heston
(74) *Attorney, Agent, or Firm* — KOS IP Law LLP

(57) ABSTRACT

A starting/generating system for an aircraft turbine engine, the starting/generating system comprising at least one brushless drive motor/generator, at least one control module and at least one power module, the power module being configured to supply/receive electric power from the brushless drive motor/generator, the control module being connected to the brushless drive motor/generator by a control cable in order to control its operation, in which system the power module is configured to be mounted in the housing of the non-pressurized zone so as to be located adjacent to the brushless drive motor/generator and the control module is configured to be mounted in a pressurized zone of the aircraft, the control module being connected to the power module by a two-way communication cable in order to control its operation.

19 Claims, 2 Drawing Sheets

(56) References Cited

U.S. PATENT DOCUMENTS

| | | |
|---|---|---|
| 2010/0283319 A1 | 11/2010 | Boudyaf et al. |
| 2014/0138479 A1 | 5/2014 | Vieillard et al. |
| 2016/0229513 A1* | 8/2016 | Scheel .................. B64D 29/08 |
| 2016/0341128 A1* | 11/2016 | Juarez Becerril ... F02N 11/0803 |
| 2017/0320585 A1* | 11/2017 | Armstrong ............. B64D 31/00 |
| 2018/0283220 A1* | 10/2018 | Duce ....................... F01D 15/10 |

OTHER PUBLICATIONS

International Search Report and Written Opinion on corresponding PCT application (PCT/EP2019/058305) from International Searching Authority (EPO) dated May 24, 2019.

\* cited by examiner

STARTING/GENERATING SYSTEM AND METHOD FOR AN AIRCRAFT TURBINE ENGINE

TECHNICAL FIELD

The present invention relates to the field of aeronautics and, more particularly, a starting/generating system for an aircraft turbine engine that is configured, on the one hand, to start a turbine engine and on the other hand to electrically power an on-board electrical network once the turbine engine is started.

A starting/generating system comprises in a known manner a drive motor to start the turbine engine. In the prior art, as indicated in patent application WO2017/068274 of the applicant, a brushless drive motor was generally used. In order to reduce maintenance costs and to increase reliability, it is now preferred to use a brushless drive motor/generator.

In a known manner, in reference to FIG. 1, the starting/generating system includes a brushless drive motor/generator 1 that is mounted in the vicinity of the turbine engine in a non-pressurised zone NP, in particular, in a housing 3 of a nacelle of the aircraft. The brushless drive motor/generator 1 is connected to a management device 2, housed in a pressurised zone P of an aircraft, in particular in an avionics bay 5.

The management device 2 comprises, on the one hand, a control module 2a connected to the brushless drive motor/generator 1 by a control cable L1 and, on the other hand, a power module 2b connected to the brushless drive motor/generator 1 by a power cable L2.

The control module 2a is configured to supply a control signal to the brushless drive motor/generator 1 via the control cable L1. The control signal corresponds for example to a direct current, called excitation current, making it possible to control during the starting the torque or the rotation speed. During the generating, the control signal makes it possible to control the voltage supplied by the brushless drive motor/generator 1. The power module 2b is connected to the on-board electrical network 4 and is configured to supply electrical power to the brushless drive motor/generator 1 to ensure the starting of the turbine engine. In generation, once the turbine engine started, the power module 2b receives electrical power from the brushless drive motor/generator 1 that it distributes to the on-board electrical network 4. In practice, the on-board electrical network 4 has a high voltage, in particular, of about 115 VAC. The control module 2a moreover makes it possible to control the electronics of the power module 2b. The management device 2 and the brushless drive motor/generator 1 each have a heavy structure and dissipate heat. Also, they each have dedicated means of cooling (not shown).

In reference to FIG. 1, the control cable L1 and the power cable L2 must be spaced apart from one another by a safety distance D, for example of about 10 cm, in order to prevent the power cable L2 from disturbing the control signal transmitted by the control cable L1, in particular, electromagnetically due to the intensity of the current circulating in the power cable L2, and the chopping principle used by the power module 2b generating disturbances linked to the quick variations in the chopped voltages. The positioning of the control cable L1 with respect to the power cable L2 is a constraint during the installation of the starting/generating system. In addition, it is necessary to provide shielding members in order limit electromagnetic disturbances.

In addition to this disadvantage, the power cable L2 has a length of several metres and thus has an intrinsic electrical resistance that results in a loss of power transmitted by the power cable L2. This intrinsic electrical resistance is all the more restrictive when the objective is to use an on-board electrical network 4 having a low voltage, in particular of about 28V. In other words, to supply a power equivalent to an on-board electrical network 4 of the 115 VAC type, it is necessary to circulate a current that has a high intensity. Thus, any intrinsic electrical resistance of the power cable L2 results in an increase in the heat generated by the Joule effect as well as a substantial drop in the power transmitted.

In order to eliminate this disadvantage, a solution would be to house the starting/generating system entirely in the housing 3 of the turbine engine, i.e. in a non-pressurised zone NP as shown in FIG. 2. For this purpose, the management device 2 is positioned adjacent to the brushless drive motor/generator 1. As the control module 2a and the power module 2b are in the vicinity of the brushless drive motor/generator 1, it is no longer necessary to have recourse to a power cable L2 of great length as in the prior art, which reduced the electrical losses. This solution however has the disadvantage of exposing the management device 2 to conditions of pressure, temperature and mechanical vibrations that render its design very difficult.

The invention therefore has for purpose to overcome these disadvantages by proposing a new starting/generating system that makes it possible, on the one hand, to limit positioning constraints between the cables and, on the other hand, to limit the losses of power while allowing for optimal operation.

SUMMARY

For this purpose, the invention relates to a starting/generating system for an aircraft turbine engine, the starting/generating system comprising at least one brushless drive motor/generator, at least one control module and at least one power module, the brushless drive motor/generator being configured to be positioned in a housing in a non-pressurised zone to start an aircraft turbine engine, the power module being configured to be connected to an on-board electrical network of the aircraft, the power module being configured to supply/receive electric power from the brushless drive motor/generator, the control module being connected to the brushless drive motor/generator by a control cable in order to control its operation.

The invention is remarkable in that the power module is configured to be mounted in the housing of the non-pressurised zone so as to be located adjacent to the brushless drive motor/generator and in that the control module is configured to be mounted in a pressurised zone of the aircraft, the control module being connected to the power module by a two-way communication cable in order to control its operation.

Thanks to the invention, a long power cable is no longer necessary given that the power module is located adjacent to the brushless drive motor/generator. This advantageously makes it possible to prevent any heating via the Joule effect or loss of power. In addition, this makes it possible to prevent any disturbance of the control cable by the power cable. Moreover, as the control module is offset from the turbine engine, the latter is not affected by the conditions of pressure and temperature, which guarantees an easier design and more reliable operation. Finally, a two-way communication makes it possible to carry out a precise control of the power module by the control module, which is particularly advantageous with a brushless drive motor/generator during the starting and generating phases. Furthermore, a two-way communication cable can be placed without substantial constraint with respect to the control cable, which accelerates the installation and the maintenance of a starting/generating system.

Preferably, the housing is metal in such a way as to form a Faraday cage which prevents the emission of electromagnetic disturbances to the outside, in particular, able to affect the control cable.

Preferably, the control module and the power module are configured to exchange digitally via the two-way communication cable. A digital communication allows for a substantial speed for reactive control. Furthermore, the shielding constraints of digital communication result in a mass that is much less than those required to shield a power cable.

Preferably, the power module comprising at least one inverter-rectifier comprising transistors, the control module comprises a calculation device configured to calculate control duty cycles of the transistors of the inverter-rectifier. Such a calculation device makes it possible to configure the power module reactively, in particular during the starting and generating phases, via the two-way communication cable. Alternatively, the calculation device is configured to calculate a current setpoint in starting mode associated with a local synchronous rectification.

According to a preferred aspect, the power module comprises at least one device for measuring one or more of the following parameters of the brushless drive motor/generator: direct voltage in interface with the on-board electrical network, phase current, control signal, speed of a rotor, angular position of a rotor, temperature. Such measurements make it possible to precisely follow the parameters of the starting/generating and allow for a reactive control to carry out an optimum starting/generating.

Preferably, the calculation device is configured to calculate the control duty cycles of the transistors of the inverter-rectifier according to one or more parameters measured by the measuring device. Thus, the controlling of the power module makes it possible to take account of the state of the brushless drive motor/generator in order to control it suitably.

According to a preferred aspect, the on-board electrical network is of the 28 VDC type.

According to an embodiment, the starting system comprises at least one cooling module, mounted in the housing, configured to cool the brushless drive motor/generator and the power module. Such a cooling module is advantageously shared between the brushless drive motor/generator and the power module, which makes it possible to limit its dimensions and therefore the size. Advantageously, as the control module does not dissipate substantial heat, it is not necessary to provide a cooling module in the pressurised zone.

The invention also relates to an aircraft comprising at least one turbine engine, at least one starting/generating system such as presented hereinabove, at least one pressurised zone and at least one non-pressurised zone. The control module of the starting/generating system is mounted in the pressurised zone while the power module and the brushless drive motor/generator of the starting/generating system are mounted in a non-pressurised zone.

Thanks to the invention, the control module remains housed in a pressurised zone (and tempered), which makes the design thereof easier and makes it more reliable. The power module and the brushless drive motor/generator of the starting/generating system are mounted together in a non-pressurised zone so as to limit power losses as mentioned hereinabove.

The invention further relates to a method for starting an aircraft turbine engine by means of a starting/generating system such as presented hereinabove, method in which:
The control module emits starting instructions to the power module via the two-way communication cable, so that it powers the brushless drive motor/generator from the on-board electrical network and
The control module emits a control signal to the brushless drive motor/generator via the control cable in order to control the torque and/or the drive speed of the brushless drive motor/generator.

Such a method for starting allows for a starting of the turbine engine that is reliable and that limits the electrical losses.

BRIEF DESCRIPTION OF THE DRAWINGS

The invention will be better understood when reading the following description, given solely by way of example, and in reference to the accompanying drawings wherein.

Note that the figures disclose the invention in a detailed manner to implement the invention, said figures of course can be used to better define the invention where applicable.

DETAILED DESCRIPTION

Figure 1:
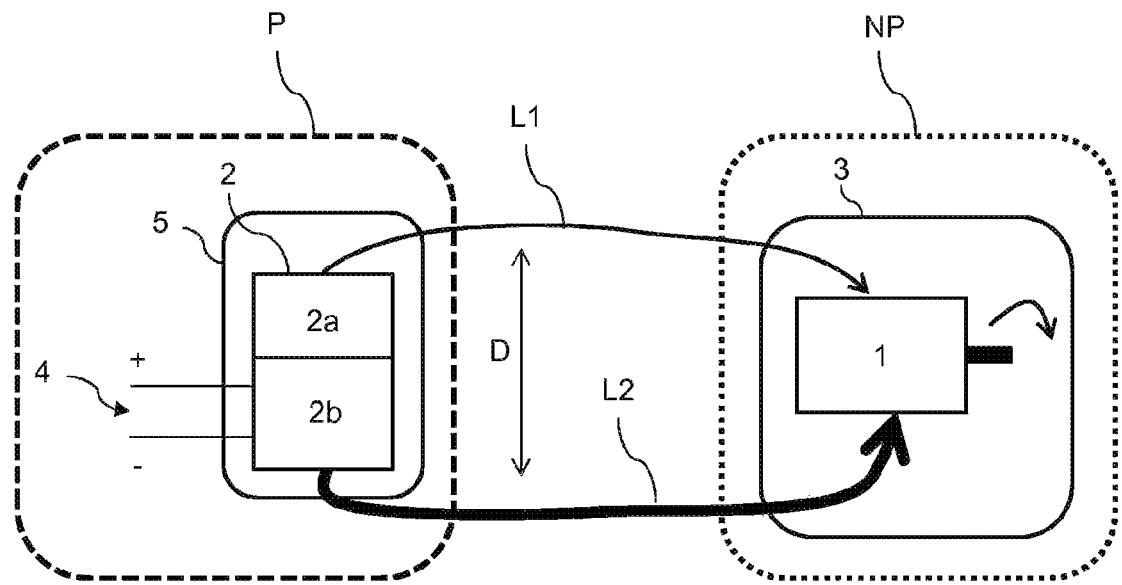
FIG. 1 diagrammatically shows a starting/generating system according to the prior art,
FIG. 2 diagrammatically shows a proposition of a new starting/generating system,
FIG. 3 diagrammatically shows a starting/generating system according to the invention and
FIG. 4 diagrammatically shown in detail a starting/generating system according to the invention.
Figure 2:
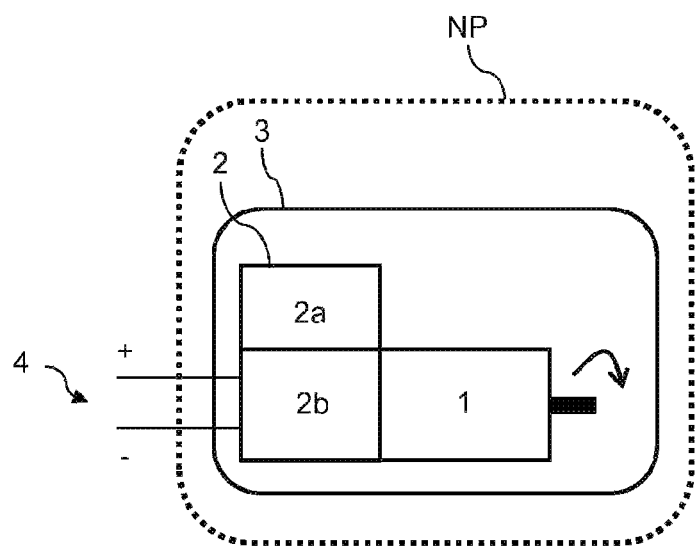
Figure 3:
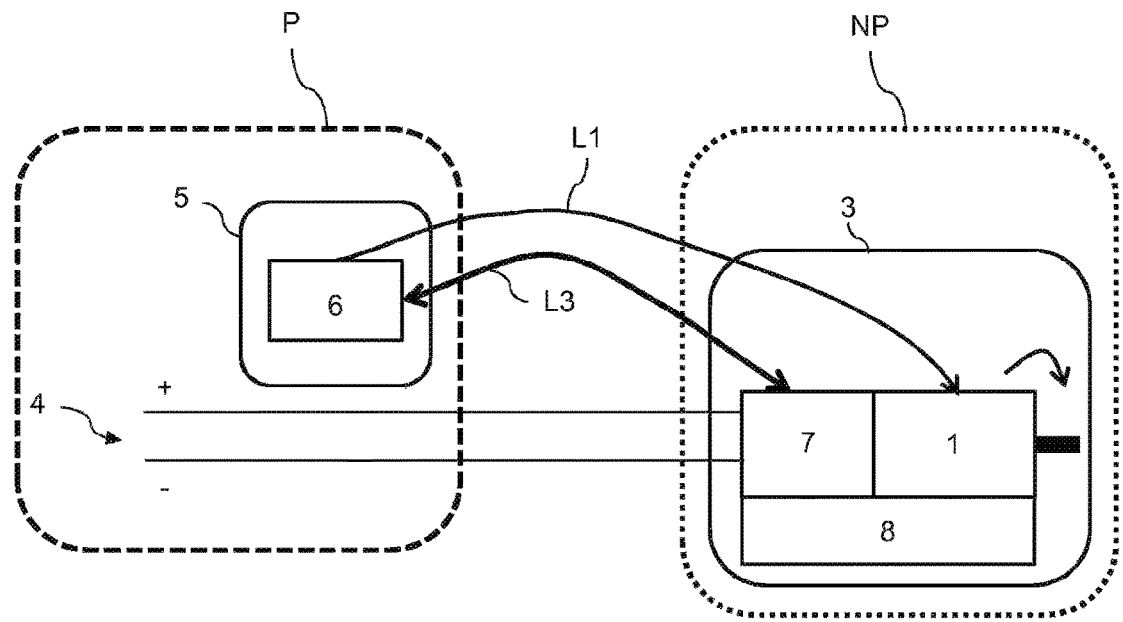

In reference to FIG. 3, a starting/generating system for an aircraft turbine engine is shown according to an embodiment of the invention. The starting/generating system comprises a brushless drive motor/generator 1, a control module 6 and a power module 7.

In reference to FIG. 3, the power module 7 is mounted in a non-pressurised zone NP of the aircraft, adjacent to the brushless drive motor/generator 1. The control module 6 is mounted in a pressurised zone P of the aircraft, at a distance from the power module 7 mounted in a non-pressurised zone NP. The control module 6 is connected to the power module 7 by a two-way communication cable L3 in order to control its operation.

The invention shall be presented for an aircraft turbine engine, in particular an aircraft turbojet, but it goes without saying that the invention also applies to a helicopter turbine engine.

The brushless drive motor/generator 1 is configured to start the turbine engine. It comprises in a known manner a stator portion (stator) and a rotor portion (rotor) rotatably mounted with respect to the stator portion. The rotor portion is connected to a shaft of the turbine engine so as to allow for the driving thereof during the starting, the rotor portion being driven by the shaft of the turbine engine during the generating of current following the starting of the turbine engine.

The power module 7 is connected to an on-board electrical network 4, in particular, a low-voltage electrical network. Preferably, the on-board electrical network 4 is of the 28 VDC type. The power module 7 is configured to supply electrical power to the brushless drive motor/generator 1 during the starting from the electrical power supplied by the on-board electrical network 4. During the starting, the on-board electrical network 4 is electrically powered by an auxiliary source. Following the starting, during the generating, the power module 7 is configured to supply the electrical power to the on-board electrical network 4 from the electrical power supplied by the brushless drive motor/generator 1. In other words, following the starting, the on-board electrical network 4 is electrically powered by the turbine engine.

Figure 4:
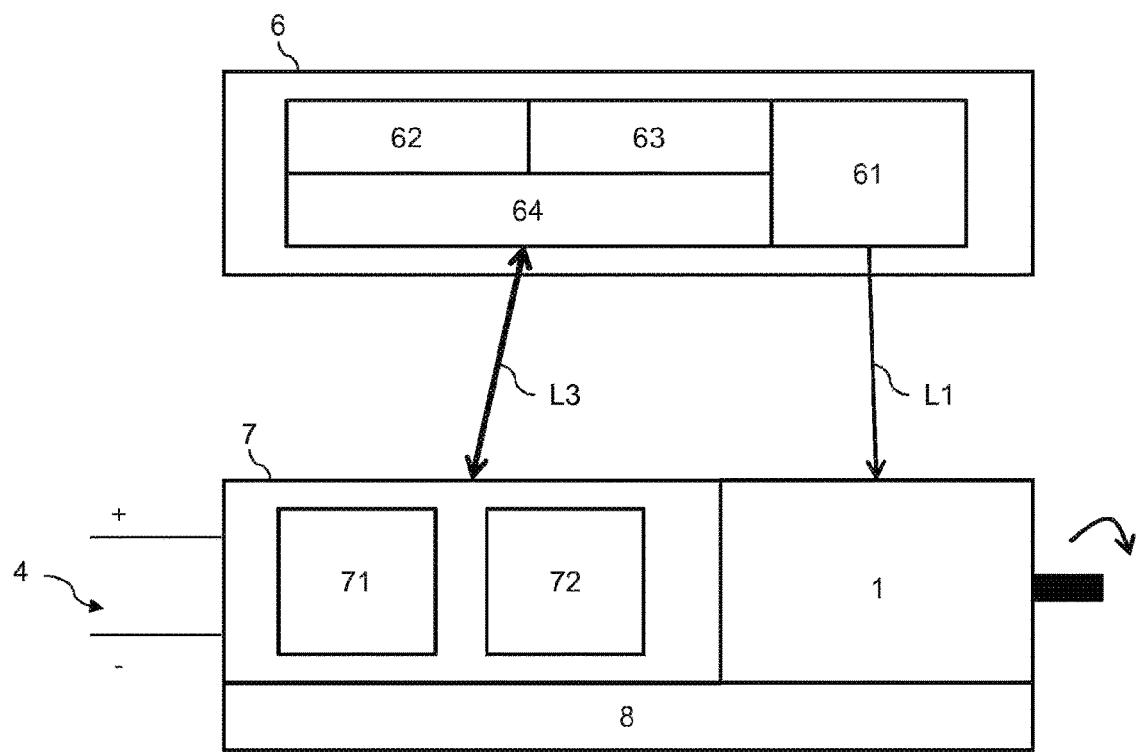

As shown in FIG. 4, the power module 7 comprises electronic components so as to electrically power and receive the electrical power from the brushless drive motor/generator 1. In particular, the power module 7 comprises at least one inverter-rectifier 71 which comprises, preferably, a plurality of controllable transistors. In this example, the power module 7 comprises at least one device for measuring 72 one or more of the following parameters of the brushless drive motor/generator 1: direct voltage in interface with the on-board electrical network 4, phase current, control signal, speed of a rotor, angular position of a rotor, temperature.

Preferably, the power module 7 and the brushless drive motor/generator 1 are separated by less than 10 cm, which limits any loss of power linked to the cabling. Preferably, the power module 7 and the brushless drive motor/generator 1 are connected together directly.

In reference to FIG. 3, the power module 7 and the brushless drive motor/generator 1 are housed in the same housing 3 in an aircraft nacelle so as to limit the size. Preferably, the housing 3 is metal so as to form a Faraday cage in order to favour electromagnetic confinement.

Optionally, the starting/generating system further comprises a cooling module 8 as shown in FIGS. 3 and 4. The cooling module 8 advantageously makes it possible to simultaneously cool the power module 7 and the brushless drive motor/generator 1 in a synergistic manner. Advantageously, the size of the cooling module 8 is substantially identical to the prior art and is mounted in the housing 3 of the nacelle. Advantageously, the control module 6 does not need to be cooled, as the starting/generating system comprises only one cooling module.

The control module 6 is configured to emit a control signal to the brushless drive motor/generator 1 in order to control its operation. In this example, in reference to FIG. 3, the control module 6 is connected to the brushless drive motor/generator 1 by a control cable L1 similar to the prior art. In a known manner, the control signal makes it possible to control the torque and/or the rotation speed of the brushless drive motor/generator 1. In practice, the control module 6 is connected to a calculator the aircraft from which it receives its instructions.

The control module 6 is also configured to control the operation of the power module 7, in particular, during the starting and during the generating. In the prior art, the control module 6 was mounted directly to the power module 7. According to the invention, the control module 6 is offset from the power module 7 and connected to the latter by a two-way communication cable L3 in order to control its operation. Preferably, the two-way communication cable L3 is of the BUS type and allows for digital communication between the control module 6 and the power module 7. Contrary to a power cable L2 according to the prior art, a two-way digital communication cable L3 induces hardly any electromagnetic disturbances on the control cable L1 (or any power losses). Also, the constraints for connecting the control module 6, located in a pressurised zone P, to the power module 7 and to the brushless drive motor/generator 1, located in a non-pressurised zone P, are eliminated given that the communication cable L3 has no impact on the control signal transmitted by the control cable L1.

As shown in FIG. 4, the control module 6 comprises a device for generating a control signal 61 configured to emit a control signal on the control cable L1 intended for the brushless drive motor/generator 1. The control module 6 comprises a device for controlling the starting 62, a device for controlling the generating 63 as well as a device for calculating 64 control duty cycles of the transistors of the inverter-rectifier 71 of the power module 7. Thanks to the devices 62, 63, 64, the control module 6 makes it possible to precisely control the power module 7, which is particularly important for a brushless drive motor/generator 1 in comparison with a drive motor/generator with brushes according to the prior art. Preferably, the different functional devices 61-64 of the control module 6 belong to the same electronic card or to several electronic cards. Alternatively, the calculation device 64 is configured to calculate a current setpoint in starting mode associated with a local synchronous rectification.

Thanks to the two-way communication cable L3, the control module 6 and the power module 7 can exchange data to carry out an optimum starting or generating. For example, the power module 7 can transmit measurements taken by the measuring device 72 so that the calculation device 64 of the control module 6 calculates optimum control duty cycles of the transistors which are transmitted to the inverter-rectifier 71 of the power module 7.

In this example, the starting/generating system is mounted in an aircraft. The aircraft comprises, on the one hand, a pressurised zone P, in particular an avionics bay 5 housed in the fuselage of the aircraft, and on the other hand, a non-pressurised zone NP, in particular, a turbine engine nacelle. The nacelle of a turbine engine is located in the immediate vicinity of the turbine engine in order to be able to start it. The nacelle comprises the housing 3 wherein the brushless drive motor/generator 1, the power module 7 and the cooling module 8 are mounted. The control module 6 is housed in the avionics bay 5. In this example, the pressurised zone P is an avionics bay 5 and the non-pressurised zone NP is a nacelle but it goes without saying that the zones could be different.

An example of an implementation of a method for starting shall now be presented. First of all, the control module 6 emits starting instructions to the inverter-rectifier of the power module 7 via the two-way communication cable L3 so that it powers the brushless drive motor/generator 1 from the on-board electrical network 4. The control module 6 also emits a control signal, generated by the generation device 61, to the brushless drive motor/generator 1 via the control cable L1 in order to control the torque and/or the drive speed of a shaft of the turbine engine in order to start it.

Preferably, the power module 7 takes measurements of parameters of the power module 7 and/or of the brushless drive motor/generator 1 and transmits the parameter or parameters measured to the control module 6 so that the latter adapts the control instructions sent to the inverter-rectifier. Preferably, the calculation device 64 of the control module 6 calculates the optimised control duty cycles of the transistors of the inverter-rectifier 71 from the parameters obtained by the measuring device 72.

The invention claimed is:

1. An aircraft, comprising:
   at least one turbine engine;
   at least one pressurised zone;
   at least one non-pressurised zone having a housing;
   an on-board electrical network; and at least one starting/generating system, the at least one starting/generating system comprising:
- at least one brushless drive motor/generator positioned in the housing of the at least one non-pressurised zone and configured for starting the at least one turbine engine;
- at least one control module connected to the at least one brushless drive motor/generator by a control cable in order to control its operation, the at least one control module is mounted in the at least one pressurised zone; and
- at least one power module connected to the on-board electrical network, the at least one power module being configured to supply/receive electric power from the at least one brushless drive motor/generator, the at least one power module is mounted in the housing of the at least one non-pressurised zone so as to be located adjacent to the at least one brushless drive motor/generator;

wherein the at least one control module is connected to the at least one power module by a two-way communication cable in order to control its operation; and wherein, the at least one power module further comprises at least one inverter-rectifier comprising transistors, the at least one control module further comprises a calculation device configured to calculate control duty cycles of the transistors of the inverter-rectifier.

2. The aircraft according to claim 1, wherein the at least one control module and the at least one power module are configured to exchange digitally via the two-way communication cable.

3. An aircraft, comprising:
at least one turbine engine;
at least one pressurised zone;
at least one non-pressurised zone having a housing;
an on-board electrical network; and
at least one starting/generating system, the at least one starting/generating system comprising:
- at least one brushless drive motor/generator positioned in the housing of the at least one non-pressurised zone and configured for starting the at least one turbine engine;
- at least one control module connected to the at least one brushless drive motor/generator by a control cable in order to control its operation, the at least one control module is mounted in the at least one pressurised zone; and
- at least one power module connected to the on-board electrical network, the at least one power module being configured to supply/receive electric power from the at least one brushless drive motor/generator, the at least one power module is mounted in the housing of the at least one non-pressurised zone so as to be located adjacent to the at least one brushless drive motor/generator;

wherein the at least one control module is connected to the at least one power module by a two-way communication cable in order to control its operation; and wherein, the at least one power module further comprises at least one inverter-rectifier comprising transistors, the at least one control module further comprises a calculation device configured to calculate control duty cycles of the transistors of the inverter-rectifier and at least one device for measuring one or more of the following parameters of the at least one brushless drive motor/generator: direct voltage in interface with the on-board electrical network, phase current, control signal, speed of a rotor, angular position of a rotor, temperature, the calculation device is configured to calculate the control duty cycles of the transistors of the inverter-rectifier according to one or more parameters measured by the measuring device.

4. The aircraft according to claim 1, wherein, the at least one power module comprises at least one device for measuring one or more of the following parameters of the at least one brushless drive motor/generator: direct voltage in interface with the on-board electrical network, phase current, control signal, speed of a rotor, angular position of a rotor, and temperature.

5. The aircraft according to claim 3, wherein, the at least one power module further comprises at least one inverter-rectifier comprising transistors, the at least one control module further comprises a calculation device configured to calculate control duty cycles of the transistors of the inverter-rectifier.

6. The aircraft according to claim 1, wherein the on-board electrical network is of the 28 VDC type.

7. The aircraft according to claim 1, wherein the at least one starting/generating system comprises at least one cooling module, mounted in the housing of the at least one non-pressurised zone, configured to cool the at least one brushless drive motor/generator and the at least one power module.

8. A method for starting an aircraft according to claim 1, the method comprising the steps of:
- powering the at least one brushless drive motor/generator from the on-board electrical network by the at least one control module emitting starting instructions to the at least one power module via the two-way communication cable so that the at least one power module powers the at least one brushless drive motor/generator; and
- controlling a torque and/or a drive speed of the at least one brushless drive motor/generator by the at least one control module emitting a control signal to the at least one brushless drive motor/generator via the control cable in order to control the torque and/or the drive speed of the at least one brushless drive motor/generator.

9. The aircraft according to claim 1, wherein the housing of the at least one non-pressurised zone is metal such that the housing forms a Faraday cage which prevents an emission of electromagnetic disturbances.

10. The aircraft according to claim 9, wherein the housing of the at least one non-pressurised zone is configured for preventing the emission of electromagnetic disturbances from affecting the control cable.

11. The aircraft according to claim 1, wherein the housing of the at least one non-pressurised zone is an aircraft nacelle.

12. The aircraft according to claim 1, wherein the at least one power module and the at least one brushless drive motor/generator are separated by less than 10 cm.

13. The aircraft according to claim 7, wherein the at least one cooling module is configured to simultaneously cool the at least one brushless drive motor/generator and the at least one power module in a synergistic manner.

14. The aircraft according to claim 1, wherein the at least one control module is not mounted directly to the at least one power module such that the at least one control module is offset from the at least one power module.

15. A starting/generating system for an aircraft, comprising:
- at least one brushless drive motor/generator configured for being positioned in a housing of at least one non-pressurised zone and for starting the at least one turbine engine;
- at least one control module connected to the at least one brushless drive motor/generator by a control cable in order to control its operation, the at least one control module is configured for being mounted in at least one pressurised zone; and
- at least one power module configured for being connected to an on-board electrical network of the aircraft, the at least one power module being configured to supply/receive electric power from the at least one brushless drive motor/generator, the at least one power module is configured for being mounted in the housing of the at least one non-pressurised zone so as to be located adjacent to the at least one brushless drive motor/generator,
- wherein the at least one control module is connected to the at least one power module by a two-way communication cable in order to control its operation; and
- wherein, the at least one power module further comprises at least one inverter-rectifier comprising transistors, the at least one control module further comprises a calculation device configured to calculate control duty cycles of the transistors of the inverter-rectifier.

16. The starting/generating system according to claim 15, wherein the at least one control module and the at least one power module are configured to exchange digitally via the two-way communication cable.

17. The starting/generating system according to claim 15, wherein, the at least one power module comprises at least one device for measuring one or more of the following parameters of the at least one brushless drive motor/generator: direct voltage in interface with the on-board electrical network, phase current, control signal, speed of a rotor, angular position of a rotor, and temperature.

18. The starting/generating system according to claim 15, wherein the on-board electrical network is of the 28 VDC type.

19. The starting/generating system according to claim 15, wherein the at least one starting/generating system comprises at least one cooling module, mounted in the housing of the at least one non-pressurised zone, configured to cool the at least one brushless drive motor/generator and the at least one power module.

* * * * *